US012598258B2

(12) United States Patent
Ramnani et al.

(10) Patent No.: US 12,598,258 B2
(45) Date of Patent: Apr. 7, 2026

(54) METHOD AND PROCESS FOR A VOICE COMMUNICATION SYSTEM BETWEEN BUSINESSES AND CUSTOMERS USING EXISTING TELEPHONY AND OVER DATA NETWORKS

(71) Applicant: DUZZCALL (PVT) LTD, Colombo (LK)

(72) Inventors: Deepak Ramnani, Colombo (LK); Luke Perera, Ragama (LK); Shageevan Sachithanandan, Matale (LK); Michael Nalpon, Singapore (SG); Thinushka Soysa, Colombo (LK)

(73) Assignee: DUZZCALL (PVT) LTD, Colombo (LK)

( * ) Notice: Subject to any disclaimer, the term of this patent is extended or adjusted under 35 U.S.C. 154(b) by 288 days.

(21) Appl. No.: 18/042,109

(22) PCT Filed: Aug. 13, 2021

(86) PCT No.: PCT/IB2021/057461
§ 371 (c)(1),
(2) Date: Feb. 17, 2023

(87) PCT Pub. No.: WO2022/038471
PCT Pub. Date: Feb. 24, 2022

(65) Prior Publication Data
US 2023/0328182 A1     Oct. 12, 2023

(30) Foreign Application Priority Data
Aug. 19, 2020    (LK)    ................................. LK/P/21301

(51) Int. Cl.
H04M 7/12         (2006.01)
H04L 61/4557      (2022.01)
H04M 1/253        (2006.01)

(52) U.S. Cl.
CPC ...... *H04M 7/1205* (2013.01); *H04L 61/4557* (2022.05); *H04M 1/2535* (2013.01)

(58) Field of Classification Search
None
See application file for complete search history.

(56) References Cited

U.S. PATENT DOCUMENTS

2005/0129193 A1* 6/2005 Watts .................... H04M 7/003
                                              379/88.17
2007/0258573 A1* 11/2007 Lowmaster ......... H04M 3/4234
                                              379/220.01

(Continued)

OTHER PUBLICATIONS

International Search Report and Written Opinion for PCT/IB2021/057461 (WO2022038471 Published Feb. 24, 2022), dated Sep. 10, 2021.

*Primary Examiner* — Antim G Shah
(74) *Attorney, Agent, or Firm* — Bradley K. Lortz; Karen S. Canady; canady + lortz LLP

(57) ABSTRACT

A system and method for integrating an existing telephony system of a business with various other existing communication equipment in a unique sequence and using call servers to facilitate voice calls to be made over data networks between businesses and customers for the purpose of low cost customer service provision. The system and method comprises a business connecting voice calls over data networks to customers registered in a dedicated directory using a digital to analog converter to convert the existing telephony system format of the business into digital format to transmit digital packets to the call server which will function as a telephone switch and connect the call to the customer and customers making voice calls over data networks to the business using the directory. Customers use a computer or mobile application which transmits digital packets to the call server which will connect the call through the converter, (Continued)

converting the format from digital to analog, to existing telephony system.

16 Claims, 4 Drawing Sheets

(56) References Cited

U.S. PATENT DOCUMENTS

| | | | |
|---|---|---|---|
| 2008/0130554 | A1 | 6/2008 | Gisby et al. |
| 2010/0260173 | A1 | 10/2010 | Johnson |
| 2011/0250895 | A1 | 10/2011 | Wohlert et al. |
| 2014/0269498 | A1* | 9/2014 | Efrati .................... H04W 76/10 |
| | | | 370/328 |
| 2014/0269618 | A1 | 9/2014 | Partridge et al. |
| 2018/0146088 | A1* | 5/2018 | Moshir .................. H04W 4/50 |

* cited by examiner

[Fig. 1]
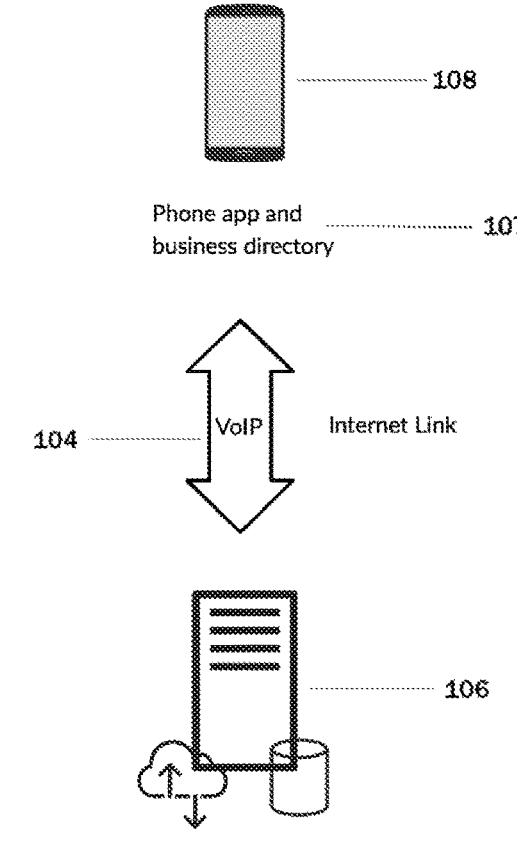
108
Phone app and
business directory ............... 107
104 ............... VoIP    Internet Link
106
Call Server
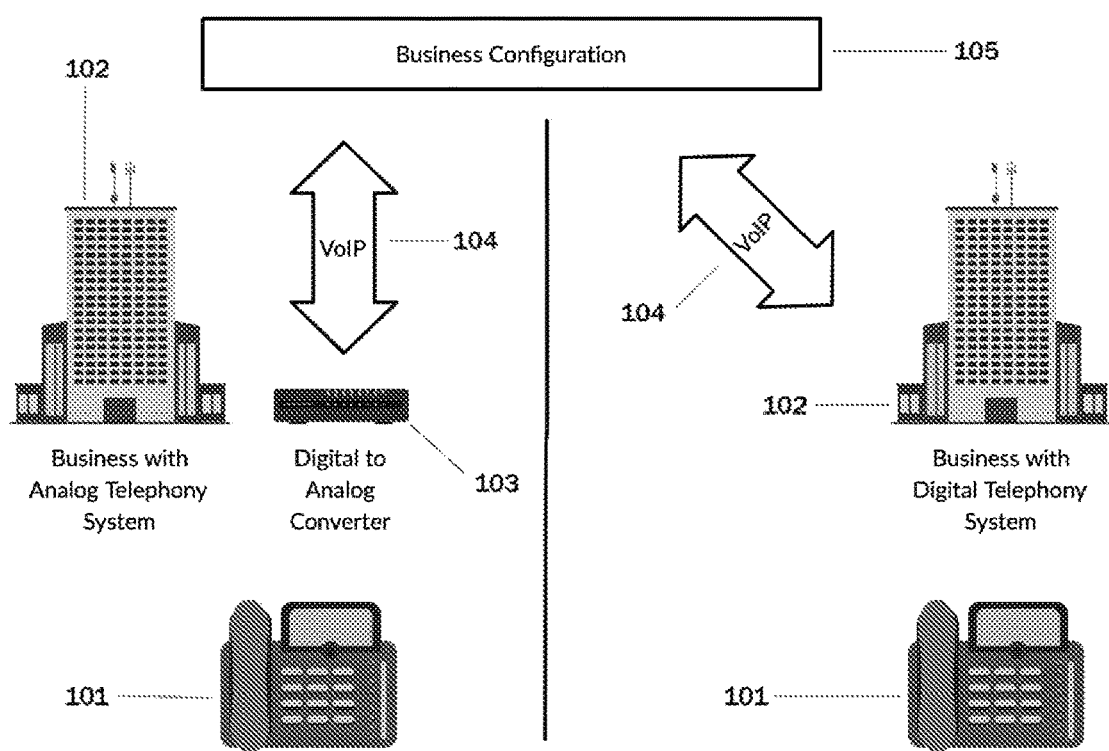
Business Configuration ............... 105
102
VoIP ............... 104
VoIP
104
102 ...............
Business with
Analog Telephony
System
Digital to
Analog
Converter ............... 103
Business with
Digital Telephony
System
101 ...............
101 ...............

[Fig. 2]
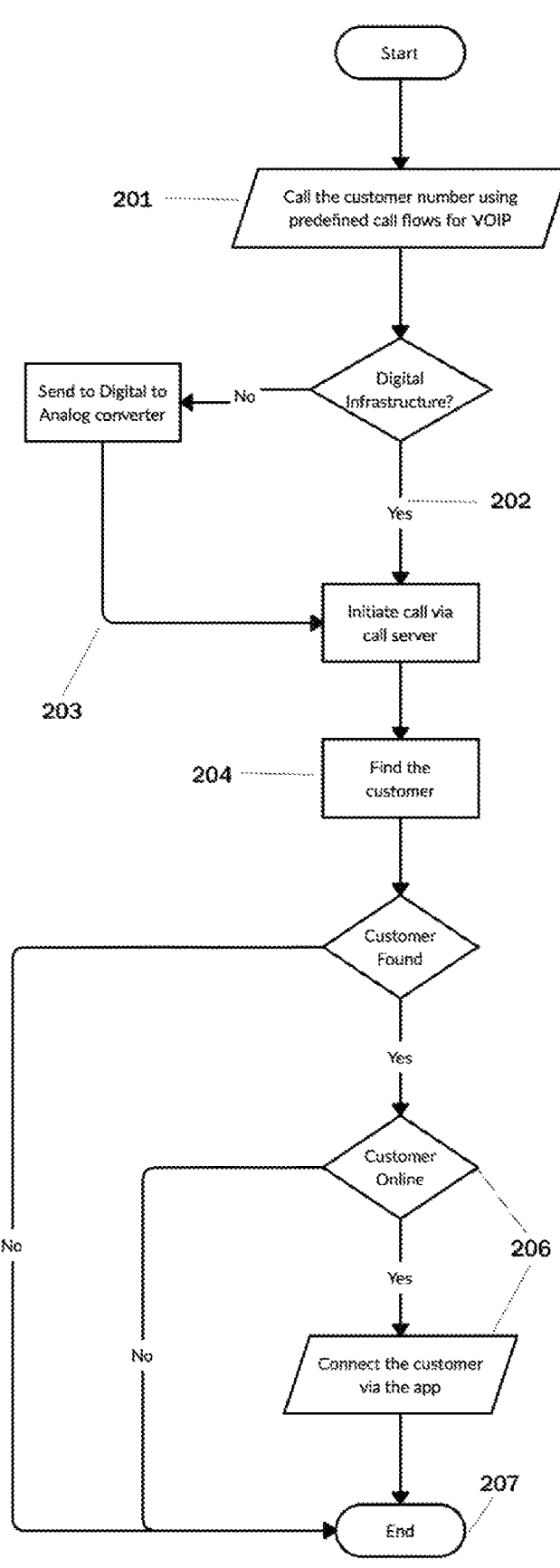

[Fig. 3]
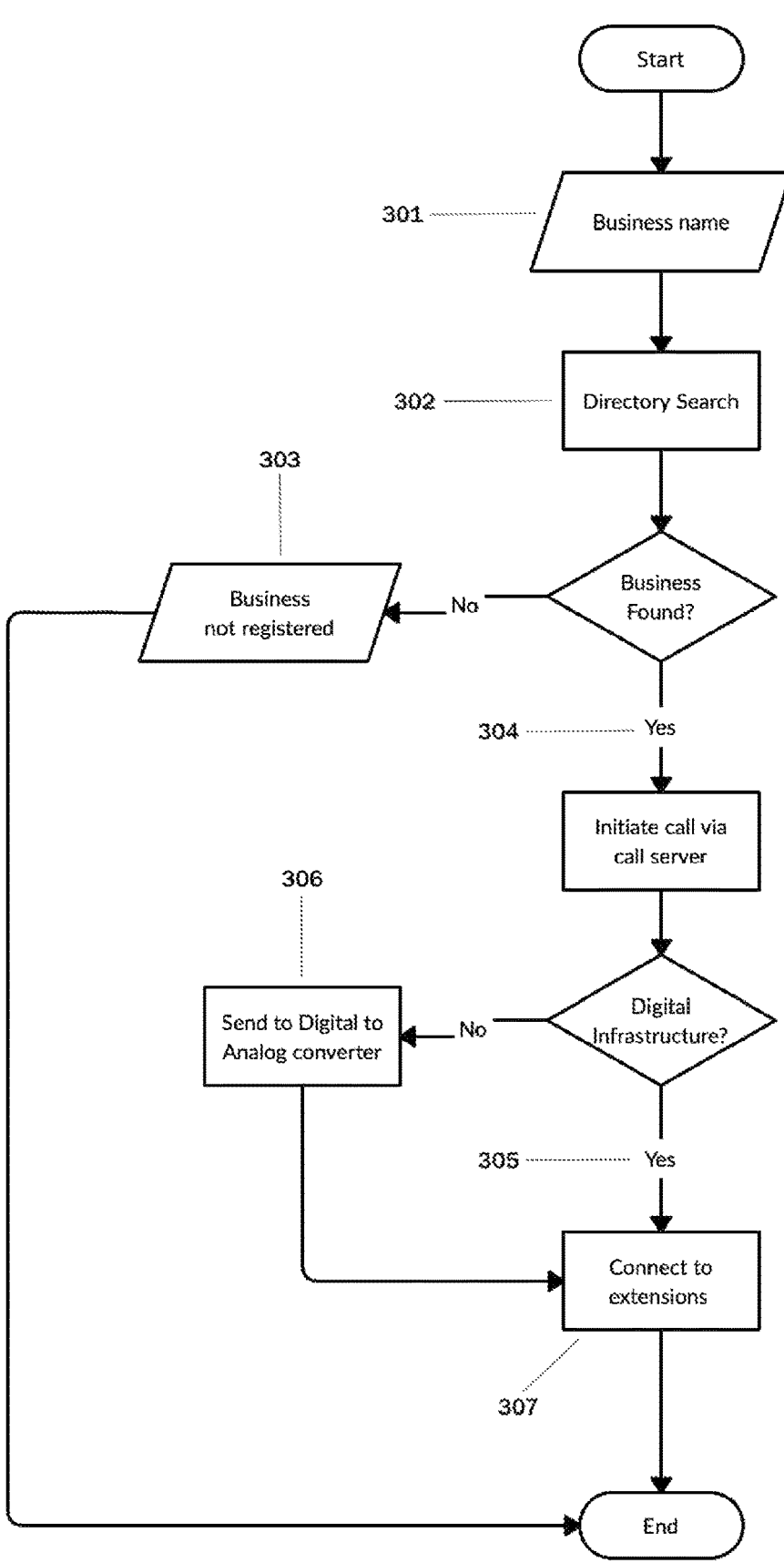

METHOD AND PROCESS FOR A VOICE COMMUNICATION SYSTEM BETWEEN BUSINESSES AND CUSTOMERS USING EXISTING TELEPHONY AND OVER DATA NETWORKS

TECHNICAL FIELD

The present invention relates in general to a methodology that allows use of existing analog or digital telephony to securely communicate (via voice calls) over data networks that permits use of traditional wired analog (landline) or wireless digital (cellular) telecommunication infrastructure to make data calls and results in substantial cost savings. In particular, the invention relates to a methodology that utilizes preexisting devices that are repurposed to interact in a unique sequence thereby providing businesses with the ability to use their existing analog and digital telephony to communicate (via voice call) with customers and have customers communicate (via voice call) with them over data networks while providing the appearance of communicating by means of traditional wired (landline) or wireless (mobile cellular) telecommunication.

BACKGROUND ART

There are currently a number of voice communication systems using data networks in the market. These systems typically require the use of new infrastructure or function through a mobile application which allow users who have downloaded and installed the mobile application onto their smartphone or other compatible device to communicate by voice call over a data network. In order for business to utilize these existing systems they would have to invest in upgrading the communication infrastructure to provide specialized phones and devices capable of supporting such mobile applications to employees within the business in order to allow them to communicate via data call with customers.

Examples of prior art that allow for VOIP calls requiring investment in specialized telephony systems include disclosure of KR20000064051A from Moneyphone Co., Ltd. which describes a system that transmits voice data to PSTN networks using a specialized multi-function phone, a computer with a predetermined control program and an operation server.

Systems currently available in the market that allow businesses to integrate their existing telephony systems to allow for voice calls using data networks are typically business to business focused.

Examples of prior art that allows for business to business voice communication over data networks include disclosure of EP1021757A1 from Starvox Inc., which describes a system for use within a company to route a voice telephone call between parties at two different locations over data network as well as the PSTN which automatically selects which of the IP networks and PSTNs to route the calls over.

Systems that do not require significant expenditure on infrastructure upgrades to utilize data calling and can be utilized by consumers to call businesses also exist however, they do not integrate with business' existing telephony systems.

Examples of prior art which allows for business and consumers to benefit from data voice calls include the disclosures of U.S. Pat. No. 7,065,070B1, KR20010096032A and P2016511972A. U.S. Pat. No. 7,065,070B1 from Ifay F Chang which describes voice communication solution for businesses whereby calls can be made from a computer by downloading a program that allows for data to an ordinary phone via a modem or a private business exchange. Customers or other members of the public can by downloading a related program make data voice calls to the voice communication service. Additionally, disclosure KR20010096032A, from Ktfreetel Co., Ltd., describes a service whereby users can make data voice calls to businesses that are preregistered on the web-to-phone service free of charge. However, this system does not allow for the use of existing telephony systems of the customers or the business as calls are made from a website. JP2016511972A, from Young Min Jeoung, describes a dedicated application or caller/receiver terminal that allows for voice data calls to be made by either a mobile network operator or a private mobile network and a public switched telephony network (PSTN). This system does not utilize the businesses current telephony system.

SUMMARY OF INVENTION

Technical Problem

Customer service communication is an integral aspect of running a business. Businesses need, on a regular basis, to communicate with customers to inform them about products and services and conversely customers need to be able to communicate with these businesses to obtain information and lodge complaints. Despite the rise of digital communication options and the expansion of channels through which customer service functions are offered (e.g. web chat or email), voice calls remain a vital communication tool for businesses and customers. However, call charges using analog and digital telephony are much higher than calls over data networks and the costs to both business and customers using analog or digital telephony can be substantial. Furthermore, established businesses have already invested in telephony systems for their organizations such as private branch exchange (PBX) systems that utilise either analog or digital telephony. Analog and digital telephony (generally known as Public Switched Telephone Network or PSTN) both involve the use of transmission networks, including telephone lines, fiber optic cables, switching centers, cellular networks, as well as satellites and cable systems to convert sound waves into electrical signals thereby allowing users to make voice calls to other users. Technological advancements have also made it possible for voice calls to be over data networks (namely voice over internet protocol [VoIP or VOIP]) where digital packet transmission over IP network allows easy integration of voice and data applications and it requires less bandwidth in carrying out voice communication compared to the conventional telephony. Utilising VOIP for customer service functions can reduce customer service costs significantly and while numerous services currently exist that allow for easy and convenient access to users to make VoIP calls rather than using traditional telephony, these do not allow business to use their existing communication infrastructure and require investment in new infrastructure. In addition, for businesses there are significant drawbacks to utilising these services to contact customers or to have customers contact them as it can be viewed as unprofessional and not all VoIP services are secure as many of them are used via mobile apps on smart phones and devices which are typically not the property of the business.

Solution to Problem

The present invention provides a cost-effective solution for allowing businesses to harness the cost benefits of using VoIP calling in a professional and secure manner by using the businesses existing analog or digital telephony systems in conjunction with software, a mobile application and other existing communication infrastructure to give access to a secure directory and perform a complete VoIP based calling with end-to-end encryption whilst allowing users to use the PSTN phone numbers assigned by analog and digital telephony providers.

Advantageous Effects of Invention

The present invention provides a method for businesses to communicate with their customers and vice versa in a secure low cost manner by utilizing a variety of existing technology and infrastructure in a novel and unique sequence to create a process whereby VOIP calling is possible within the confines of traditional analog and digital telephony systems. The use of a digital to analog converter permits businesses to use their exiting telephony infrastructure to make VOIP calls to customers by converting digital format into a format supported by the existing telephony infrastructure. The businesses' telephony systems interface through the analog converter or directly with servers that utilize software in order to function as a telephone switch and connect one caller with another. The use of a customizable digital directory stored on the call server through a mobile application which interfaces with the servers allows customers to register and connect with businesses in the directory. Businesses however, cannot place calls to a customer if the customer has not initiated contacted with the business. All calls between the businesses and customers and vice versa are encrypted end-to-end using Transport Layer Security (TLS).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way.

BRIEF DESCRIPTION OF DRAWINGS

The foregoing and other features of embodiments will become more apparent from the following detailed description of embodiments when read in conjunction with the accompanying drawings. In the drawings, like reference numerals refer to like elements.

FIG. 1 is a pictorial diagram of the system adopted to use the present invention that illustrates how the mobile application, the existing communication infrastructure and the PSTN of the business user interface.

FIG. 2 illustrates a business to consumer (B2C) communication session configured according to the embodiment of the present invention.

FIG. 3 illustrates a consumer to business (C2B) communication session configured according to the embodiment of the present invention.

DESCRIPTION OF EMBODIMENTS

Figure 4:
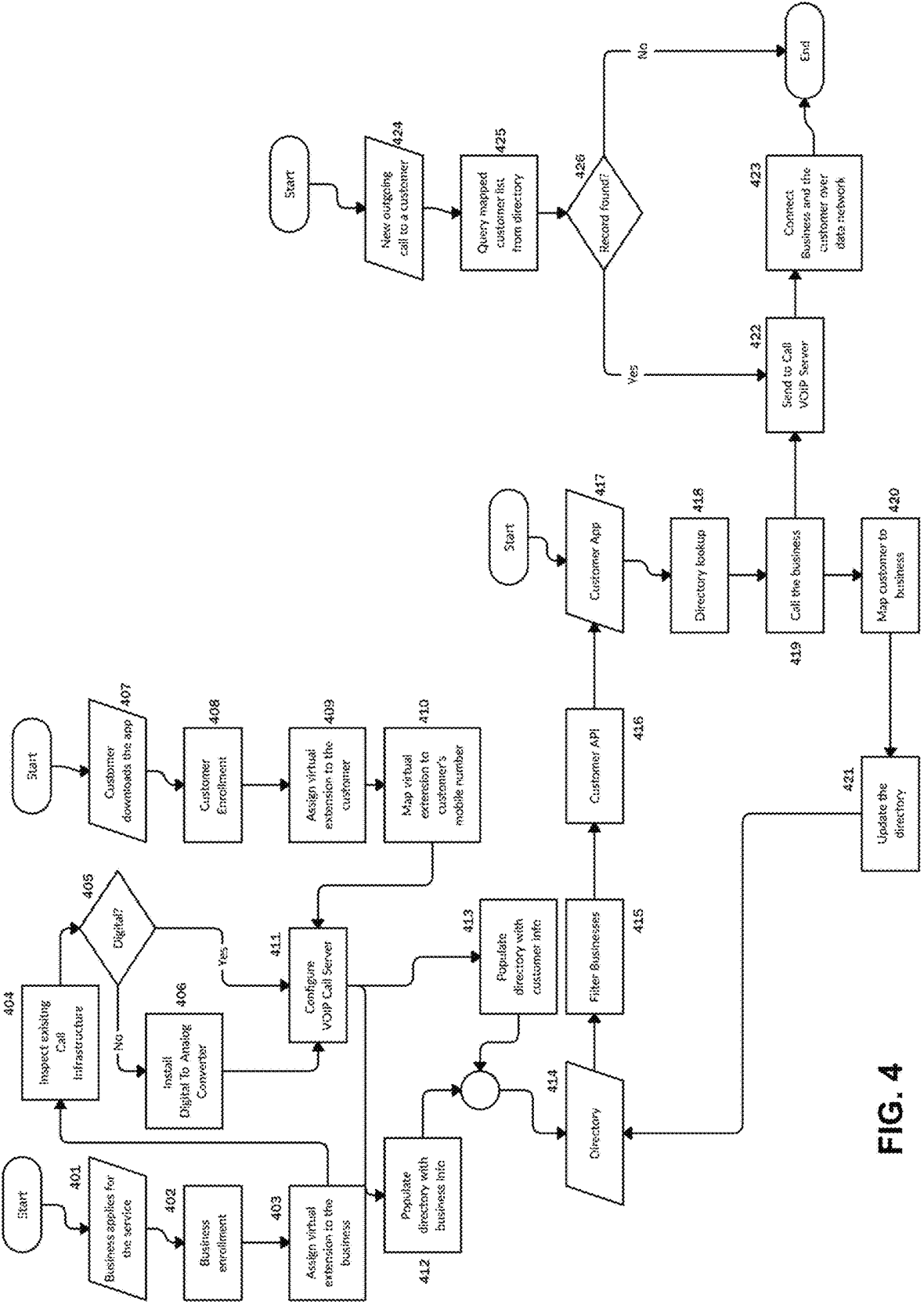
FIG. 4 is a flow diagram illustrating the steps executed to implement the embodiment of the present invention.

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention overcomes the drawbacks of businesses using VOIP technology to communicate with customers in a professional manner without making significant changes to their existing telephony systems. The present invention discloses a process that integrates existing technology and infrastructure in a unique sequence thereby enabling businesses to reap the benefits of less expensive VOIP calling in their customer service functions. The present invention comprises of a digital to analog converter that can be modified to provide businesses with enhanced call services, a call server that can be customized to use various call frameworks and a mobile application which can be used by customers. Further, the ability for business to use their existing telephony infrastructure to make VOIP calls to customers and allow customers to make VOIP calls to the businesses customer service lines makes it one of a kind in the commercial market.

The business is required to simply use the customized analog to digital converter to enable it to convert its existing telephony format into a digital format thereby allowing its existing telephony system to digitally communicate with the call server. The call server functions as a telephone switch and manages the set up or connection of the VOIP calls. Both the converter and call servers are configured to the businesses needs to enable the use of the businesses existing telephony for the purpose of customer service calls to verified customers who are in the customized directory and mapped to that business. The mobile application can be downloaded by customers and used to register so as to contact the business by way of VOIP call. The software or mobile application set-up for the present invention will function to mask this virtual number assigned for the purposes of VOIP calling to give the appearance of direct dialing from a user's commonly used telephone number. Use of TLS ensures end-to-end encryption of all calls.

FIG. 1 pictorial diagram of the system adopted to use the present invention that illustrates how the process in the present invention operates. Depending on the existing telephony infrastructure of the business, a converter (103) is configured to function with the existing telephony infrastructure (102) to allow for a user within the business to use an existing telephone unit (101) to make a data call (104). The data call made by the business is routed through the call server (106) and the converter (103) and call server is configured (105) specifically for that business to identify the customer with whom the user within the business is attempting to communicate. Once the customer is identified the data call (104) is then routed to the registered telephone unit of the customer (108). The mobile application (107) will permit the customer to authorize the business to contact the customer when the customer has previously initiated communication with the business via the mobile application. The customer is able use the present invention to communicate with the business by using the customers mobile phone unit (108) to place a data call (104) via the mobile application (107). The customer's data call is routed through the call server (106) which is configured to connect the call to the relevant telephone number within the businesses telephony system (102) either via the converter (103) or directly.

FIG. 2 illustrates the protocol used for a registered business to initiate and execute a voice call using data networks with a customer. Using a telephone unit within the existing telephony system the caller from within the registered business will dial the customers number using predefined call flows for VOIP (201). The call is either directly routed to the call server, where digital infrastructure is available within the businesses existing telephony system (202), or is routed through a digital to analog converter (203) to the call server, where digital infrastructure is not available within the businesses existing telephony system, in order to identify the customers unique identification code (204) and if the customer is not registered in the directory then the call will end (206) or if the customer is a registered in the directory and if the customer is mapped to the business, online and available the VOIP call is routed to customer via the mobile application (206) and if the customer is not mapped to the business, online and available the call will end (207).

FIG. 3 illustrates the protocol used for a registered customer to initiate and execute a voice call using data networks with a business. Using the mobile application the customer will enter the business name (301) and the mobile application will perform a directory search (302) if the business is not a registered business (303) the call will end however, if the business is a registered business then the call is routed to the call server (304) to the businesses existing telephony system either directly (305) or through the digital to analog converter (306) and will connect to the predefined extension number within the businesses existing telephony system (307).

FIG. 4 depicts the steps followed to execute the process in the present invention. Businesses will need to apply (401) to be enrolled (402) to use the service. A virtual extension will be allocated to the business (403) and its existing telephony infrastructure will be evaluated (404) to determine whether an Analog to Digital Converter is required (405 and 406). Similarly, customers will be required to download a mobile application (407) and enroll to use the service (408) and be assigned a virtual extension (409) which is mapped to the customer's existing mobile telephone number (410). Once a business and a customer are enrolled the call servers will be configured accordingly (411) to allow for business and customers to connect via VOIP call with each other. Information relating to the customer and the business will be populated (412 and 413) into directory (414) stored on the call server. Information on businesses that have enrolled for the service and are listed in the directory will be visible to customers through the mobile application (415 and 416). Customers are able to find businesses they want to communicate with within the mobile application (417 and 418) and initiate a call (419) which will map the customer to the business (420) by updating the directory (421) (to enable the business to also contact the customer) and will connect the call to the business (423) using VOIP and via the call server (422). Businesses are also able to initiate calls by simply using their existing telephony infrastructure to place a call to the customer (424) and if the customer has enrolled for the service and their information has been populated into the directory (425) then the VOIP call will be connected to customer (423) via the call server (422).

INDUSTRIAL APPLICABILITY

The present invention has application for all business with a significant customer service operation such as banks, retail chains, supermarkets, taxi aggregators and others as it will enable them to benefit from significant cost savings of VOIP without having to make large investments in upgrading or modifying their existing telephony systems.

Cost saving benefits of VOIP calls can also be passed on to customers by enabling them to make VOIP voice calls directly to the business simply by downloading a mobile application and completing a registration process.

The invention claimed is:

1. A method for a voice communication system which enables a business to use an existing telephony system to make calls over digital data networks to customers and for the customers to make voice calls over the digital data networks to the business, the method comprising:

configuring the existing telephony system for a business to allow the existing telephony system to connect digital communication with a call server over the digital data networks; and configuring the call server to maintain a digital directory for extensions for the business and the customers, provide authentication, secure communication and route the calls and the voice calls between the business and the customers whose information is contained in the digital directory following customer registration and business registration for the call server to connect the calls and the voice calls;

wherein each of the customers employ a software application to initiate and receive the voice calls over the digital data networks by communicating with the call server;

wherein the call server requires a digital format to digitally communicate and connect all the calls and the voice calls through the call server;

wherein the call server routes only the calls and the voice calls between the business and the customers whose information is contained in the digital directory such that if the business is not registered in the digital directory the calls are ended by the call server and if the customer is not registered in the digital directory the voice calls are ended by the call server; and wherein the customer registration further comprises each customer being assigned a virtual extension which is mapped to each customer's existing telephone number.

2. The method of claim 1, wherein configuring the existing telephony system for the business comprises configuring an analog to digital converter to function with the existing telephony system for the business to allow the existing telephony system to connect digital communication with the call server over the digital data networks.

3. The method of claim 1, wherein the software application of each of the customers comprises a mobile application installed on a smart phone.

4. The method of claim 1, wherein the customer registration comprises each customer being registered in the digital directory on the call server and the business registration comprises the business being registered in the digital directory on the call server.

5. The method of claim 1, wherein the customers each connect to the call server directly over the digital data networks not including any PSTN networks and the call server only connects the voice calls to others directly connected to the call server.

6. The method of claim 1, wherein the analog to digital converter connects to the existing telephony system only within the business in order to provide digital communication between the existing telephony system within the business and the call server.

7. The method of claim 1, wherein all the voice calls are encrypted end-to-end using Transport Layer Security (TLS).

8. The method of claim 1, wherein the call server functions as a telephone switch and manages the connection of all the voice calls using VOIP.

9. A system for a voice communication system which enables a business to use an existing telephony system to make calls over digital data networks to customers and for the customers to make voice calls over the digital data networks to the business comprising:

a call server configured to maintain a digital directory for extensions for the existing telephony system of a business and the customers, provide authentication, secure communication and route the calls and the voice calls between the business and the customers whose information is contained in the digital directory following customer registration for the call server to connect the calls and the voice calls;

wherein the existing telephony system for the business is configured to allow the existing telephony system to connect digital communication with a call server over the digital data networks;

wherein each of the customers employ a software application to initiate and receive the voice calls over the digital data networks by communicating with the call server;

wherein the call server requires a digital format to digitally communicate and connect all the calls and the voice calls through the call server;

wherein the call server routes only the calls and the voice calls between the business and the customers whose information is contained in the digital directory such that if the business is not registered in the digital directory the calls are ended by the call server and if the customer is not registered in the digital directory the voice calls are ended by the call server; and wherein the customer registration further comprises each customer being assigned a virtual extension which is mapped to each customer's existing telephone number.

10. The system of claim 9, further comprising an analog to digital converter to function with the existing telephony system for the business to allow the existing telephony system to connect the digital communication with the call server over the digital data networks.

11. The system of claim 9, wherein the software application of each of the customers comprises a mobile application installed on a smart phone.

12. The system of claim 9, wherein the customer registration comprises each customer being registered in the digital directory on the call server and the business registration comprises the business being registered in the digital directory on the call server.

13. The system of claim 9, wherein the customers each connect to the call server directly over the digital data networks not including any PSTN networks and the call server only connects the voice calls to others directly connected to the call server.

14. The system of claim 9, wherein the analog to digital converter connects to the existing telephony system only within the business in order to provide digital communication between the existing telephony system within the business and the call server.

15. The system of claim 9, wherein all the voice calls are encrypted end-to-end using Transport Layer Security (TLS).

16. The system of claim 9, wherein the call server functions as a telephone switch and manages the connection of all the voice calls using VOIP.

\* \* \* \* \*